(12) United States Patent
Specht et al.

(10) Patent No.: US 6,240,848 B1
(45) Date of Patent: Jun. 5, 2001

(54) DEVICE FOR FIRING A PYROTECHNIC PROPELLENT COMPOSITION

(75) Inventors: Martin Specht, Feldafing; Thomas Ludwig, Tutzing, both of (DE)

(73) Assignee: Breed Automotive Technology, Inc., Lakeland, FL (US)

(*) Notice: Subject to any disclaimer, the term of this patent is extended or adjusted under 35 U.S.C. 154(b) by 0 days.

(21) Appl. No.: 09/068,802

(22) PCT Filed: Nov. 15, 1996

(86) PCT No.: PCT/EP96/05040

§ 371 Date: Aug. 10, 1998

§ 102(e) Date: Aug. 10, 1998

(87) PCT Pub. No.: WO97/18975

PCT Pub. Date: May 29, 1997

(30) Foreign Application Priority Data

Nov. 17, 1995 (DE) .............................................. 195 42 954

(51) Int. Cl.$^7$ .............................. B60R 21/32; F42C 1/04; F42C 15/24
(52) U.S. Cl. .......................... 102/216; 102/249; 102/252; 102/274; 280/734; 89/132
(58) Field of Search ...................................... 102/216, 247, 102/252, 273, 272, 274, 249, 251; 89/136, 132, 27.11, 27.13, 27.14, 27.3; 280/731, 734

(56) References Cited

U.S. PATENT DOCUMENTS

| | | | |
|---|---|---|---|
| 4,573,706 | * 3/1986 | Breed | 280/734 |
| 4,771,914 | * 9/1988 | Kaneda et al. . | |
| 4,819,960 | * 4/1989 | Breed . | |
| 4,927,172 | * 5/1990 | Motozawa | 280/734 |
| 5,149,134 | * 9/1992 | Fohl . | |
| 5,188,393 | * 2/1993 | Fohl . | |
| 5,328,204 | * 7/1994 | Kawaguchi et al. . | |
| 5,431,102 | 7/1995 | Nishizawa . | |
| 5,454,322 | * 10/1995 | Sakamoto et al. . | |
| 5,483,846 | * 1/1996 | Sakamoto et al. . | |

FOREIGN PATENT DOCUMENTS

| | | | |
|---|---|---|---|
| 490987 | * 1/1919 | (DE) | 102/29.4 |
| 314716 | * 10/1919 | (DE) | 102/252 |
| 0376446 | * 5/1923 | (DE) | 89/27.11 |
| 1177525 | * 9/1964 | (DE) | 102/272 |
| 2709339A1 | * 9/1977 | (DE) . | |
| 0 642 958 | 3/1995 | (EP) . | |
| 2 273 647 | 6/1994 | (GB) . | |

* cited by examiner

Primary Examiner—Peter M. Poon
Assistant Examiner—James S. Bergin
(74) Attorney, Agent, or Firm—Markell Seitzman

(57) ABSTRACT

A device for firing a pyrotechnic propellent composition having a sensor mass (3) which for firing purposes releases a locking lever (4) which in the rest position bears lockingly against a ring (9) of the firing pin (1).

15 Claims, 4 Drawing Sheets

DEVICE FOR FIRING A PYROTECHNIC PROPELLENT COMPOSITION

The invention concerns a device as set forth in the classifying portion of claim 1.

A device of that kind serves for the firing of a pyrotechnic propellent composition, in particular of a gas generator. Propellent compositions of that kind are used in particular in motor vehicles in order to drive components, for example a piston or a rotary piston in a tube or a housing so that safety components on the vehicle are moved from a normal position into a safety position. For example a telescopic steering column is reduced in length by drive devices of that kind. It is also known for safety belts which bear loosely against the body of the vehicle occupants to be tightened by means of pyrotechnically operated belt tensioners. It is also known for a filling gas to be produced by means of a fired propellent composition, for filling air bags. To fire the respective propellent compositions, it is known to drive a firing or striker pin in its axial direction by means of a drive spring. There is also a locking means which holds the drive spring and therewith the firing pin in the rest position. In the event of excessive acceleration a sensor mass is moved, by which the locking means is released so that the drive force of the spring can act on the firing pin (EP 0 529 501 A1). {EP-A-642 958 describes a trigger mechanism for a motor vehicle safety device. It comprises an ignition pin urged towards the detonator by a spring, a mass and its biassing spring as wall as a pivotable trigger lever which holds the pin in position with a hook arrangement and is prevented from pivoting by contact with the mass. During sudden acceleration, the mass moves relative to its casing allowing the trigger lever to pivot so releasing the ignition pin.

U.S. Pat. No. 5,431,102 relates to a mechanical acceleration sensor including a sensor casing, a weight, a spring-loaded firing pin and a latch lever, each being movably mounted in the sensor casing in such a manner as to either translate along an axis or to rotate about an axis. The latch lever is moved by inertial movement of the weight allowing the firing pin to perform a percussive firing action by the spring load.

In the mechanical sensors which have heretofore been proposed, including the above described sensors no firing actuating means movable with respect to the firing pin has been described providing an accurate alignment of the firing pin with a firing opening and compensating production tolerances.}

The object of the invention is to provide a device of the kind set forth in the opening part of this specification, which is acceleration-sensitive, comprises mechanical components, and can be universally employed.

In accordance with the invention that object is attained by the characterising features of claim 1.

The drive spring can be held in a prestressed rest position by means of the locking lever which is supported at a stationary location, in particular of the sensor housing. A torque acts on the locking lever, in the direction of its release position, due to the prestressing of the drive spring. In the rest position, that is to say below a given triggering threshold, the sensor mass provides that the release moment which acts on the locking lever is carried at an abutment which in particular can be provided on the sensor mass.

Preferably, besides a first support location which is supported in particular on a firing pin actuating means and with which the drive force of the drive spring is carried, the locking lever may have a second support location which, as viewed in the drive direction, is displaced outwardly and which is supported stationarily, in particular on the sensor housing. That arrangement ensures that for release of the locking lever, which is caused by the moved sensor mass, the locking means is moved into its release position by the drive force of the drive spring and at the same time the drive force of the spring is utilised for the firing procedure.

For that purpose the locking lever may have a third support location which bears against an abutment, in particular on the sensor mass.

Preferably the locking lever is in the form of a double-sided locking lever whose axis, which is not stationary, is formed by the first support location or is in the immediate vicinity of the first support location, and in which the second and third support locations are provided at the two sides of the lever.

Preferably a ring is provided on the firing pin as the firing pin actuating means. It is displaceable by the drive force of the drive spring towards the firing pin.

In the rest condition the firing ring bears against the first support location of the locking lever under the prestressing effect of the drive spring.

When the locking means is released, the ring which can be in the form of a striker or firing ring is moved towards an anvil on the firing pin and is impacted thereagainst. Due to the impact, the firing pin is accelerated towards the firing means for the propellant and upon impact thereof fires the propellant.

For guidance of the striker ring the firing pin may have a shank along which the striker ring is accelerated towards the anvil by the drive spring.

The firing pin is mounted with its shank on the sensor housing, at the end which is opposite to the firing tip. That mounting configuration ensures that the firing pin is mounted with its tip that projects out of the sensor housing, movably in a radial direction with respect to its axis, at its end that is opposite to the firing tip. That arrangement provides for accurate alignment of the firing pin with a firing opening in a housing which can be fitted on to the sensor housing and in which the propellant is disposed. The alignment with the firing opening ensures that the firing tip of the firing pin impinges precisely on the firing device of the propellant upon acceleration thereof by the drive spring. Production tolerances can be compensated by virtue of that design configuration, and this arrangement always guarantees that the firing pin is aligned with the propellant firing device.

It is also possible for the firing pin actuating means to be pivotable about an axis, the drive spring acting on the firing pin actuating means by way of a lever arm. As in the first embodiment the firing pin is held in a pre-positioned condition with respect to the firing device and the firing pin actuating means can be impacted on to the pre-positioned firing pin. In that respect the impact surface on the firing pin may be of relatively large size so that production tolerances in regard to alignment of the firing pin with respect to the firing device do not have a detrimental effect.

The drive spring and the firing pin actuating means may also comprise one piece. For that purpose the drive spring is in the form of a leaf spring which is subjected to a pre-stressing effect and on which the firing pin actuating means is possibly integrally formed.

The invention will be described in greater detail hereinafter by means of embodiments by way of example with reference to the drawings in which.

Figure 1:
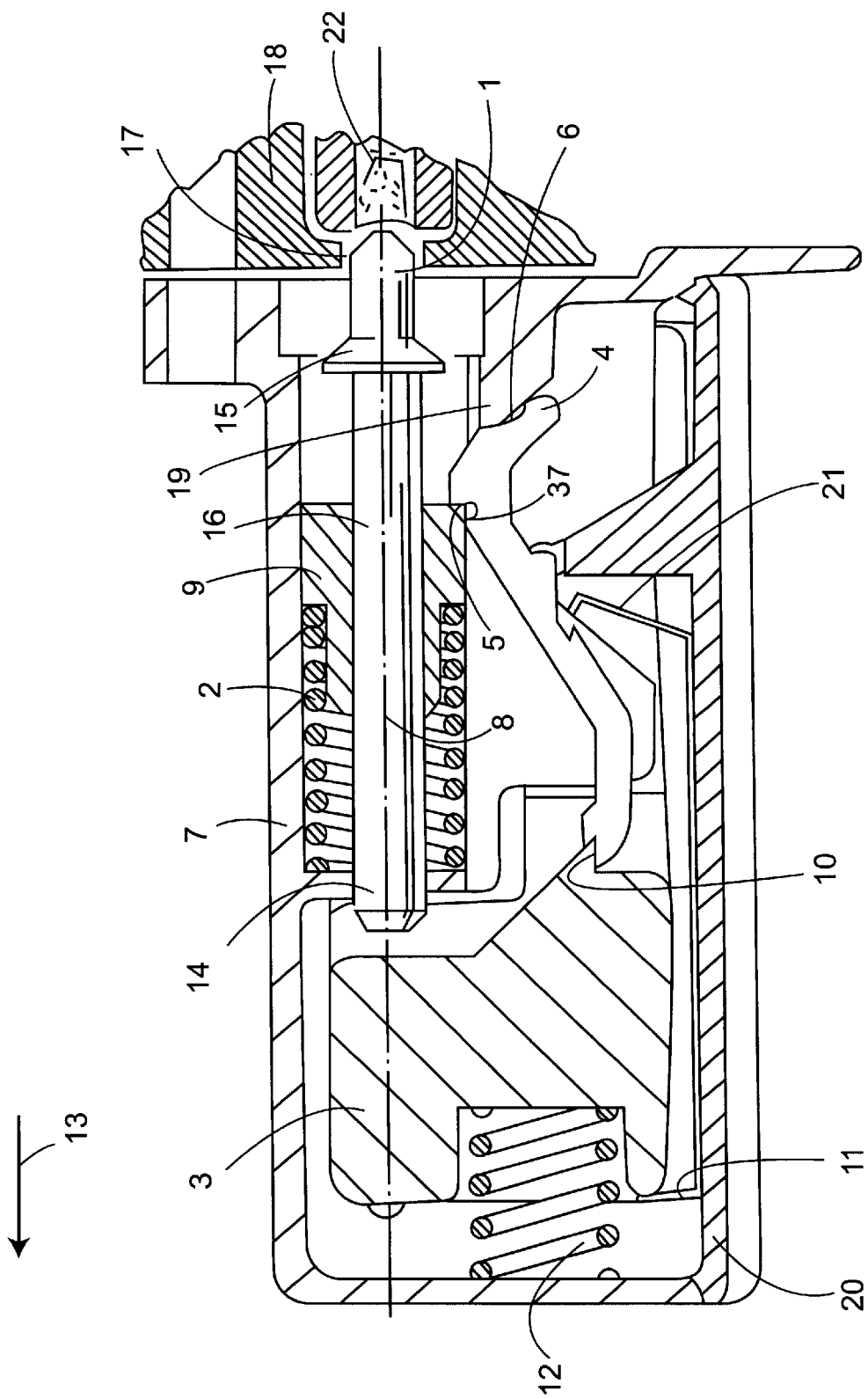
FIG. 1 shows a first embodiment.

The same references are used in the Figures for components which have the same action.

Reference 7 denotes a sensor housing in which a striker or firing pin 1 is mounted with an end 14 of its shank 16, which is in opposite relationship to the striker or firing tip. A ring 9 which acts as a striker ring is displaceably mounted on the shank 16 of the firing pin 1. The ring 9 on which a drive spring 2 acts in the drive direction is held in the illustrated rest position by a locking means in the form of a locking lever 4. For that purpose the looking lever 4 has a first support location 5. The locking lever 4 also has a second support location 6 which is supported at a stationary location 19 on the sensor housing 7.

The striker pin is mounted in a force-free condition with its shank 16 between two loose mountings, in the housing. It serves for axially guiding the ring 9 when the latter is moved towards an anvil 15 provided on the striker pin 1.

A sensor mass 3 is also provided in the housing. The sensor mass 3 is mounted on a parallel guide means 11 which can be in the form of parallel link springs. The sensor mass 3 is movable against the force of a sensor spring 12 which in the illustrated embodiment is in the form of a coil spring. The direction of movement is indicated by an arrow 13. When the illustrated device is arranged in a vehicle, the direction of movement of the sensor mass 3 against the force of the spring 12 is the same as the direction of forward travel, that is to say the direction of the arrow 13.

The force of the sensor spring 12 can be adjusted by way of means which are not shown in greater detail.

In the rest position shown in the Figure, a third support location 10 on the locking lever 4 bears against an abutment on the sensor mass 3. The abutment on the sensor mass carries the torque which is exerted on the locking lever 4 by the drive spring 2 in the illustrated rest position. The illustrated mechanical firing device is held in readiness in that rest position.

The locking lever 4 is in the form of a double-sided lever. Its axis of rotation, which is not stationary, is formed in the region of the first support location 5. The lever arm between the third support location 10 and the first support location 5 is longer than the lever arm between the first support location 5 and the second support location 6. In addition, with respect to a pin axis 8 along which the ring 9 can be driven by the spring 2, the first support location 9 is provided on the locking lever 4 at an inward position and the second support location 6 is provided on the locking lever 4 at an outward position. In the illustrated rest position the operative torque is carried by the abutment of the sensor mass 3, against which the third support location 10 of the locking lever 4 bears.

Assembly of the illustrated device is effected from below in the Figure. After installation of the individual components, the lower side of the sensor housing 7 is closed by a cover 20. An assembly securing means holds the components in the correct position.

A housing 18 which has a firing device 22, for example a mechanical fuse, is arranged on the sensor housing 7 in such a way that the firing pin 1 is disposed with its firing tip opposite the firing device 22. In order to align the firing pin 1 with the firing device 22, the housing 18 in which the propellant is arranged as a firing opening 17. The housing 18 is arranged on the outside of the sensor housing 7 in such a way that the firing pin tip of the firing pin 1 projects into the firing opening 17, as shown in the Figure. That ensures that the firing pin tip is aligned with the firing device 22 in the direction of the firing pin axis 8.

Production tolerances can be compensated by virtue of the fact that the firing pin 1 which is mounted at its opposite end 14 to the sensor housing 7 is movable in a radial direction with respect to its axis 8 so that alignment with the firing device 22 is always guaranteed when the firing pin 1 projects into the firing opening 17 of the housing 18.

The illustrated firing device can be combined in that way with any housings 18 which contain gas generators or propellants.

If, in the event of an excessive level of acceleration, that is to say when a given acceleration value is exceeded, the sensor mass 3 is moved in the direction of the arrow 13 against the force of the spring 12, the support surface 10 of the locking lever 4 is released so that the release moment produced by the spring 12 comes into operation and the locking means is released. At the same time the ring 9 which acts as a striker ring is moved along the shank 16 towards the anvil 15 and impacts thereagainst at high speed so that, as a reaction thereto, the firing pin 1 impacts with its striker tip against the firing device 22 and fires the propellant. When that happens the drive spring 2 is supported against the sensor housing 7 and drives the ring 9 in the described manner after the first support location 5 has been moved away from the ring 9 by the release moment.

The spacing of the striker ring 9 from the anvil 15 is of sufficient magnitude so that the drive spring 2 produces an adequate speed or acceleration of the striker ring 9 and the firing pin 1 fires the firing device 22.

Figure 2:
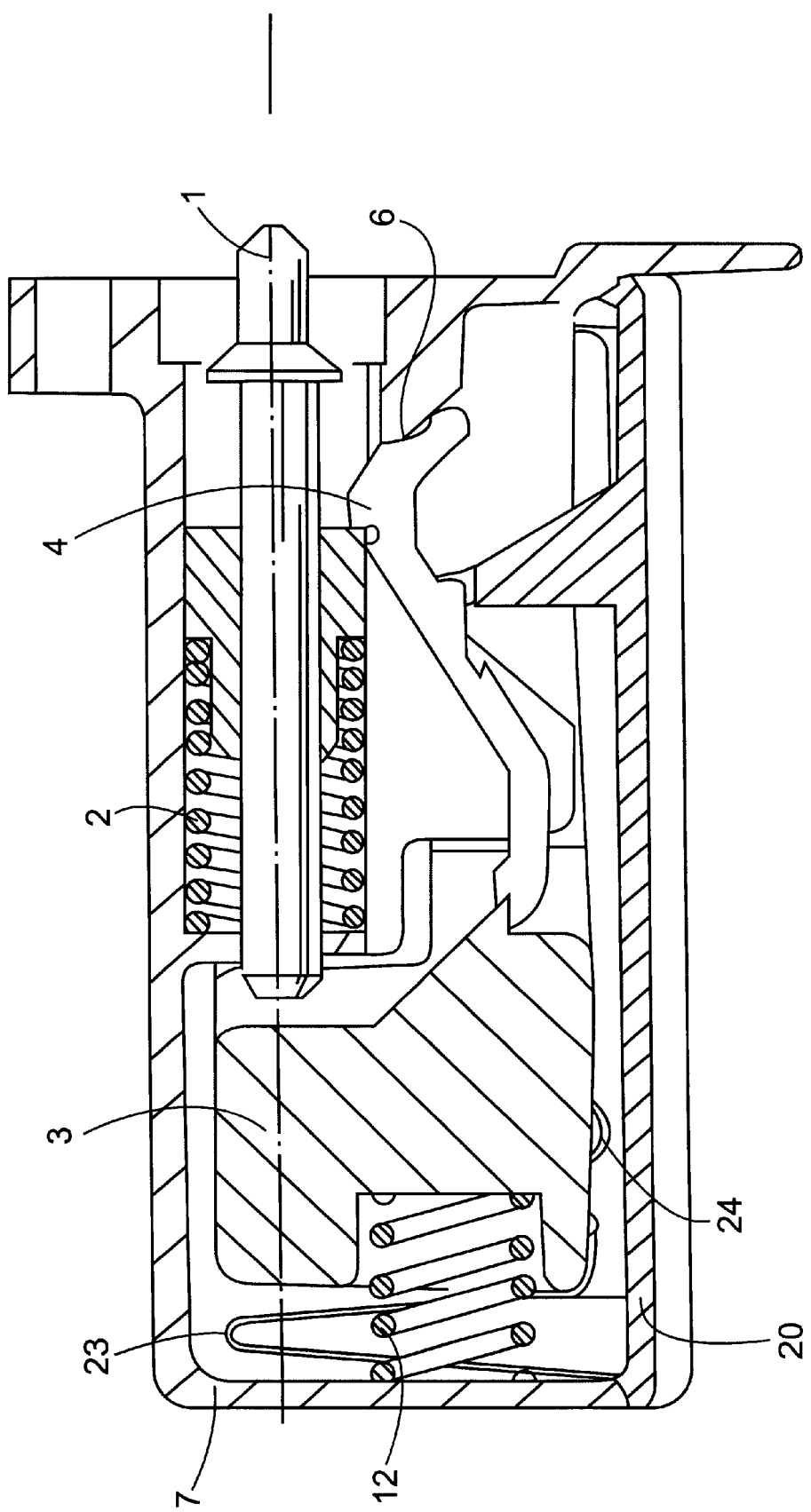
FIG. 2 shows a second embodiment.

In the embodiment shown in FIG. 2 transverse link springs which form the parallel guide means have damping loops or bows 23 and 24. The damping loop 23 acts in the longitudinal direction of the vehicle to have an oscillation-damping effect on deflections of the sensor mass 3. A damping loop 24 acts transversely to the longitudinal direction of the vehicle to have an oscillation-damping effect on deflections of the sensor mass 3. That prevents the spring-mass system of the sensor from being excited to a condition of resonance oscillation, as a result of external vibration phenomena.

Figure 3:
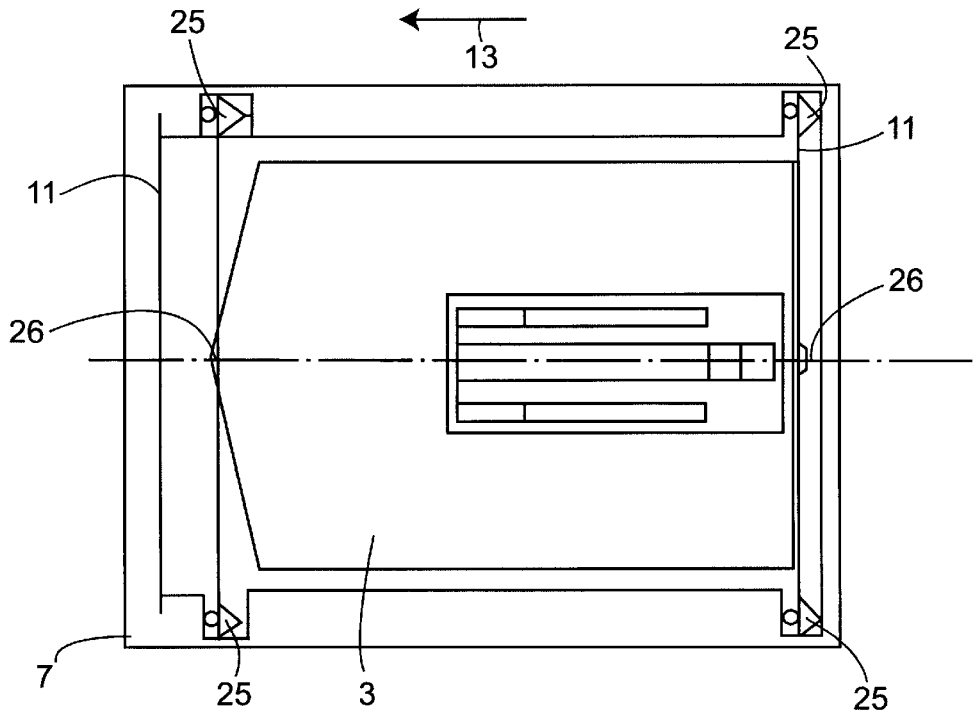
FIG. 3 is a plan view of a configuration for parallel guidance of the sensor mass, which can be used in the embodiments.

FIG. 3 is a plan view of a further embodiment of a parallel guide means for the sensor mass 3. For that purpose the arrangement has transverse link springs for forming the parallel guide means. The parallel link springs are secured for example by rivets 26 to the sensor mass 3 and supported with respect to the housing 7 at securing locations 25. That ensures that the sensor mass 3 can be deflected in the direction of travel in the housing 7 against the force of the sensor spring (not shown).

Figure 4:
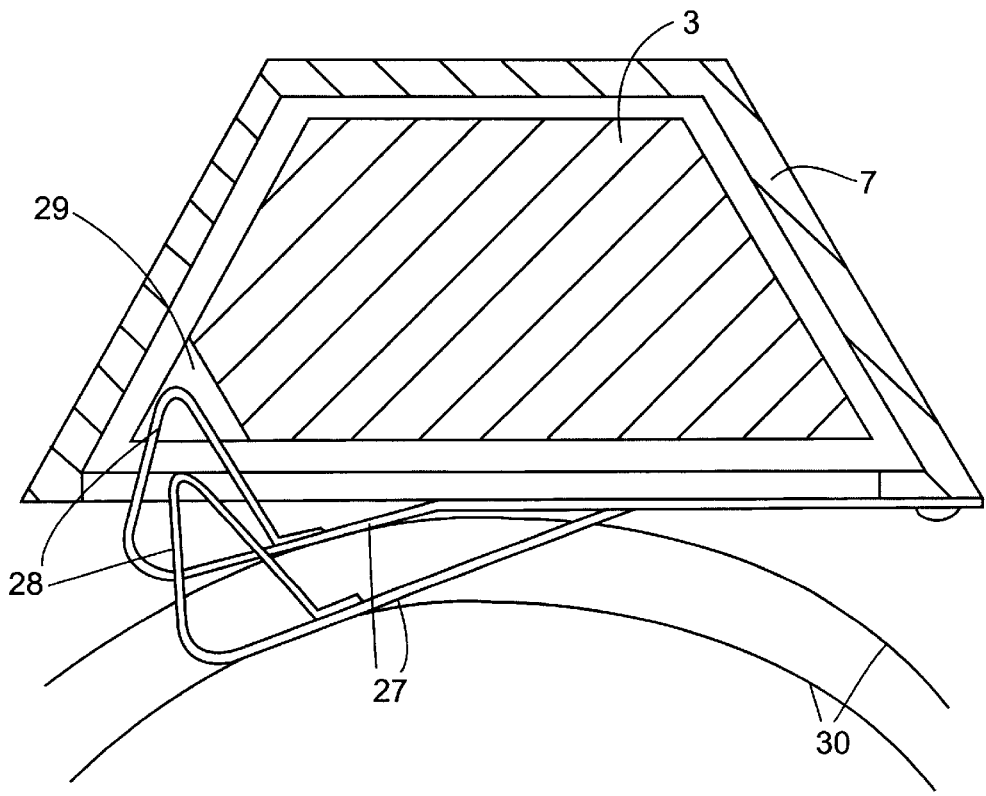
FIG. 4 shows a further configuration which can be used in the embodiments.

The embodiment illustrated in FIG. 4 has a feeling or sensing device 27 which is of a resilient configuration and which feels or senses a respective belt reel periphery 30. The belt reel is part of a safety belt retractor which is not illustrated in greater detail herein. Depending on the respective periphery or diameter of the belt reel, a blocking projection 28 is in engagement or out of engagement with an engagement location 29 of the sensor mass 3.

If for example the safety belt webbing is completely wound on to the belt reel (outer belt reel periphery 30) the blocking projection 28 is in a condition of engagement with the sensor mass 3 so that movement of the sensor mass 3 is blocked. When the diameter of the belt reel periphery is smaller, for example when the safety belt is fitted, the blocking projection 28 is in a condition of being out of engagement with the sensor mass so that the sensor mass can move in response to excessive acceleration or deceleration of the vehicle.

When the blocking projection 28 is in a condition of engagement with the sensor mass 3, then for example upon transportation of the belt retractor which is provided with the device according to the invention, it can be blocked to prevent movement thereof. That blocking action can also be provided when the vehicle or the safety belt is in a park position.

Figure 5:
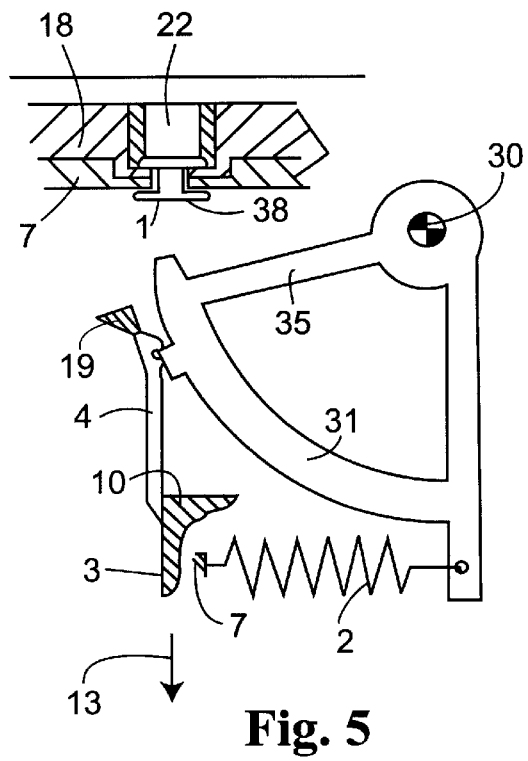
FIG. 5 shows a third embodiment.

In the embodiment shown in FIG. 5 the striker or firing pin 1 is held in its pre-positioned condition with respect to the firing device 22. The firing pin 1 is disposed in an opening of the housing 7, which opening is disposed immediately opposite the firing device 22. A firing pin actuating means 31 is arranged rotatably about an axis 30. The drive spring 2 acts on the firing pin actuating means 31. The firing pin actuating means 31 is held in the rest position by the locking lever 4 in the same manner as in the case of the embodiments of FIGS. 1 and 2. After release of the locking lever 4 the firing pin actuating means 31 is driven by way of a lever arm 35 by the drive spring 2 which is in the form of a tension coil spring, and is impacted against an impact surface, which is of relatively large size, of the firing pin 1. The firing pin 1 is accelerated in the opening in the housing 7 towards the firing device 22 and the latter is fired.

Figure 6:
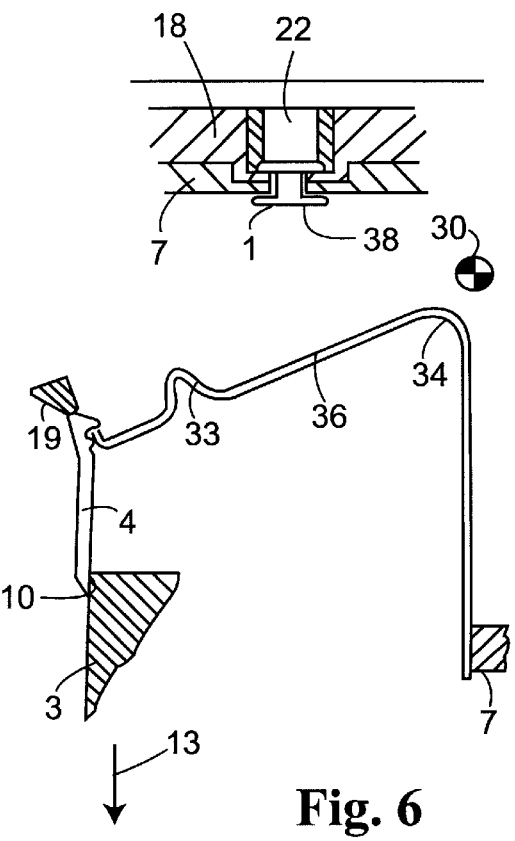
FIG. 6 shows a fourth embodiment.
Figure 7:
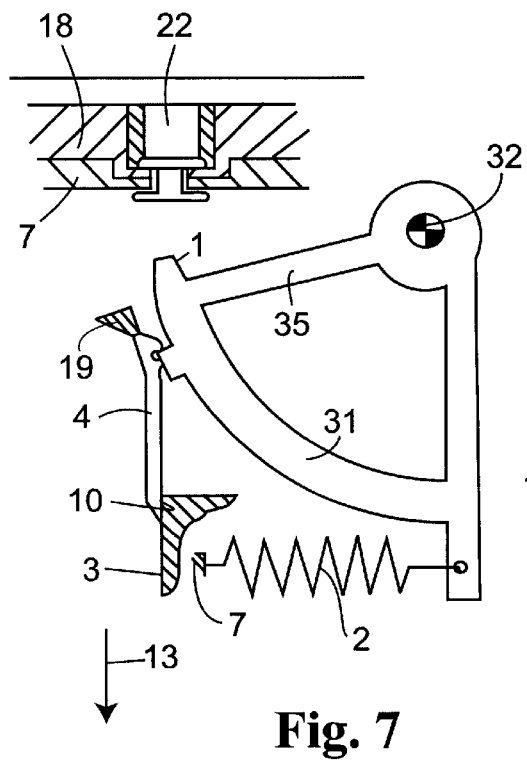
FIG. 7 shows a fifth embodiment.

The embodiment illustrated in FIG. 6 has a drive spring 34 in the form of a curved leaf spring. The spring force acts by way of a lever arm 36 about the pivot axis 30 on a firing pin actuating means 33 which is formed on the spring in the form of a projection. After release of the locking lever 4 the firing pin actuating means 33 will impact against the firing pin 1 so that it fires the firing device 22, as in the embodiment of FIG. 5.

Figure 8:
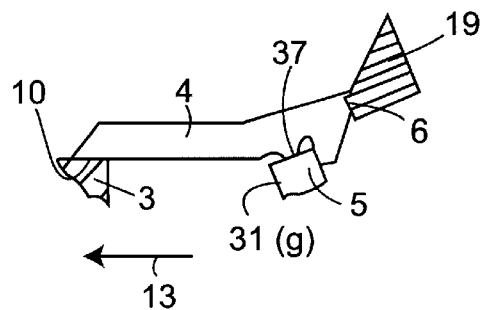
FIG. 8 shows a specific configuration of the locking lever.

As can be seen from FIG. 8 the locking lever 4 can have a projection which, upon release thereof, acts as a pivot point 37, with which projection the locking lever 4 can bear against the firing pin actuating means 31. The locking lever 4 can be additionally supported with the pivot point 37, in the embodiment shown in FIGS. 1 and 2 in which the firing pin actuating means is in the form of a striker ring. When the locking lever 4 is released the moment imparted by the drive spring 2 or the drive spring 34 respectively acts on the locking lever in such a way that is rotated about the pivot point 37. As can be seen from FIG. 8, the support surfaces 5 and 6, between which the release moment becomes operative, are arranged in mutually displaced relationship whereby the force transmitted to the support surface 5 by the drive spring 2 by way of the firing pin actuating means 9 or 31 respectively produces a torque by which the locking lever 4 is rotated about the pivot axis 37 after the sensor mass 3 has moved away from the support surface 10 in the direction of the arrow 13, when in its locking position, and is thereby released.

What is claimed is:

1. A device for firing a pyrotechnic propellant composition comprising: a firing pin drivable by a drive spring, a locking means which holds the drive spring in a prestressed rest condition and having a locking lever, which is supported at a stationary location and which is subjected to the action of a release moment due to the prestressing of the drive spring and being held in the rest position by a sensor mass, which is moved, away from the locking lever, upon excessive acceleration and by which the locking means can be released, wherein the firing pin (1) is held in a prepositioned condition with respect to a firing device of the pyrotechnic propellant composition, and a firing pin actuating means (9; 33) is provided which is movable with respect to the firing pin (1) and movable about a pivot axis and which is drivable by the drive spring (2; 34) and can be impacted against the firing pin (1).

2. A device according to claim 1 wherein the locking lever (4), which in the rest position is supported at least at two support locations (5, 6), these two support locations are positioned on one side of a pivot point of the lever, wherein a first of the support locations (5) carries the drive force of the drive spring (2) and a second of the support locations (6) bears against the sensor housing (7).

3. A device according to claim 1 wherein the firing pin (1) is linearly drivable in the direction of its longitudinal axis (firing pin axis (8)).

4. A device according to claim 1 wherein the drive spring (2) is in the form of a coil spring which acts on a ring (9) on the firing pin (1) for transmission of the drive force.

5. A device according to claim 1 wherein the locking lever (4) has a third support location (10) which bears against the sensor mass (3) in the rest position.

6. A device according to claim 1 wherein the first support location (5) forms an axis, which is not stationary, of the locking lever (4) which is of a double-sided configuration, and the second and third support locations (6, 10) are provided at the ends of the lever.

7. A device according to claim 1 wherein the sensor mass (3) is guided by means of a parallel guide means (11) on the sensor housing (7).

8. A device according to claim 7 wherein the parallel guide means (11) has transverse link springs.

9. A device according to claim 7 wherein the parallel guide means (11) has an oscillation-damping action.

10. A device according to claim 1 wherein the sensor mass (3) is guided in parallel relationship to the firing pin axis (8).

11. A device according to claim 1 wherein the sensor mass (3) is movable in opposite relationship to the direction of the force of a sensor spring (12).

12. A device according to claim 11 wherein, when installed in a vehicle, the direction of the force of the sensor spring (12) is directed in opposite relationship to the direction (13) of forward travel of vehicle.

13. A device according to claim 1 wherein the drive spring (2; 34) drives the firing pin actuating means (33) by way of a lever arm (36).

14. A device according to claim 1 wherein after release of the sensor mass (3) from the third support surface (10) the locking lever (4) is movable under the influence of the release moment about a pivot point (37) supported at the firing pin actuating means (9).

15. A device according to claim 1 wherein the firing pin has an impact surface (38) for the firing pin actuating means, which impact surface is of a larger area than the cross-sectional area of the remaining part of the firing pin.

* * * * *